United States Patent [19]

Yamamoto

[11] Patent Number: 5,182,703
[45] Date of Patent: Jan. 26, 1993

[54] METHOD AND APPARATUS OF TWO-DEGREES-OF-FREEDOM TIME DIFFERENCE COMPARISON COMPENSATOR

[76] Inventor: Nobuo Yamamoto, 2917-111 Mawatari, Katsuta-shi, Ibaraki 312, Japan

[21] Appl. No.: 553,377

[22] Filed: Jul. 17, 1990

[30] Foreign Application Priority Data

Jul. 22, 1989 [JP] Japan .................................. 1-190263

[51] Int. Cl.⁵ .............................................. G05B 13/00
[52] U.S. Cl. .................................... 364/148; 364/157; 364/164
[58] Field of Search ............... 364/157, 150, 149, 148, 364/164; 318/561

[56] References Cited

U.S. PATENT DOCUMENTS

| | | | |
|---|---|---|---|
| 4,679,136 | 7/1987 | Shigemasa | 364/150 |
| 4,864,490 | 9/1989 | Nomoto et al. | 364/157 |
| 4,904,912 | 2/1990 | Yamamoto | 318/561 |
| 5,062,066 | 10/1991 | Scher et al. | 364/578 |

OTHER PUBLICATIONS

Taguchi et al., "Optimal Parameters of Two-Degrees-of-Freedom PID Control System," Reports of Transaction of Society of Instrument and Control Engineers, vol. 23, No. 9, 1987, Abstract Only Considered.
Francis, "The Multivariable Servomechanism Problem from the Input-Output Viewpoint," IEEE Transactions on Automatic Control, vol. AC-22, No. 3, Jun. 1977, pp. 322-328.

*Primary Examiner*—Robert W. Beausoliel
*Assistant Examiner*—Allen M. Lo
*Attorney, Agent, or Firm*—Antonelli, Terry, Stout & Kraus

[57] ABSTRACT

Herein disclosed according to the present invention are method and apparatus of two-degrees-of-freedom time difference comparison compensator. In a control system using a conventional regulator, a desired value or reference value is inputted to the regulator through a versatile time difference compensator. The apparatus may be constructed in the form of a versatile control apparatus to be realized as a hardware, a software or a composite having the two functions, an exclusive control apparatus, or a built-in control apparatus for an individual control system. Thus, the control system to be provided has an excellent effects in the relevant industry because it can make adjustments to the highest state while satisfying several characteristics such as the quickness of response and the stabilizability of perturbations or other several characteristics such as robust stabilizability simultaneously.

8 Claims, 6 Drawing Sheets

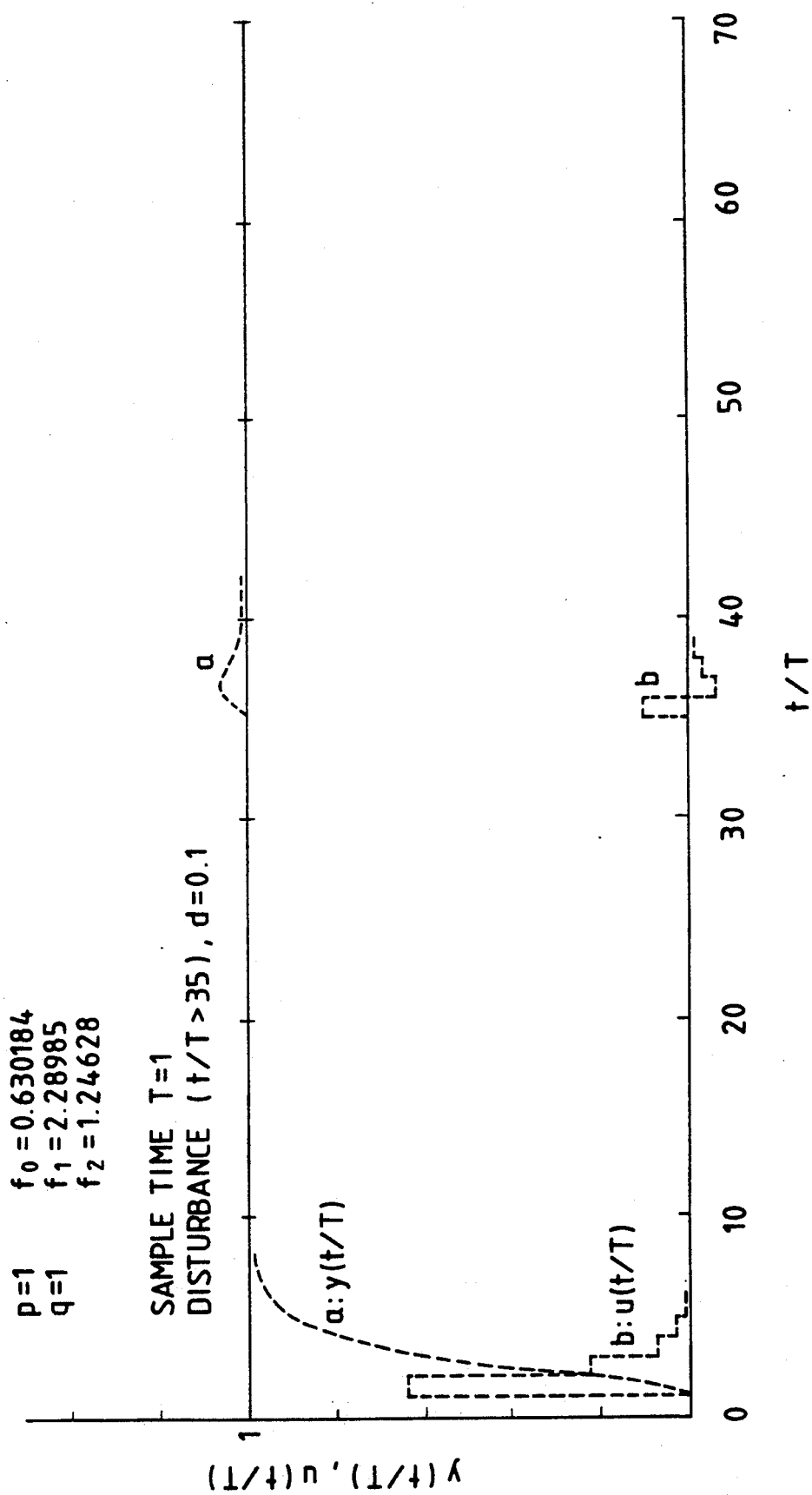

METHOD AND APPARATUS OF TWO-DEGREES-OF-FREEDOM TIME DIFFERENCE COMPARISON COMPENSATOR

BACKGROUND OF THE INVENTION

The present invention relates to a method and apparatus of two-degrees-of-freedom time difference comparison compensator for widely a feedback control system and, more particularly, a servo-system.

What is important in the feedback control system is not only the stability but also the quickness of responses, the stabilizability of perturbations and the robust stabilizability, all of which are desired to be fully versatile. The quickness of responses, and the stabilizability of perturbations or other several characteristics such as robust stabilizability are accompanied by physical conditions contracting one another. Thus, it is frequently urged to select what is to be stressed more the quickness of responses, the stabilizability of perturbations or other characteristics. The most powerful solution is the two-degrees-of-freedom control method of various modes, of which the most useful one is the I-PD control of the two-degrees-of-freedom control (as disclosed in "Optimum Parameters of Two-Degrees-of-Freedom PID Control System" written by Hidefumi Taguchi, Masateru Doi and Mitsuhiko Araki and belonging to Reports of Transaction of the Society of Instrument and Control Engineers, 23-9, 889/895 (1987)). According to this report, considerable effects are obtained in the quickness of responses, the stabilizability of perturbations and other characteristics. In the digital control using the optimal regulator, too, there are introduced into the countermeasures for the removal of steady state errors and perturbations the internal model principle (Bruce A. Francis: The multivariable Servomechanism Problem from the Input-Output View point, IEEE TRANSACTIONS ON AUTOMATIC CONTROL, Vol. AC-22, No. 3, 322/328 (1977)). By this introduction, satisfactory results are obtained in the quickness of responses, the stabilizability of perturbations and other characteristics. Generally, those characteristics are fairly excellent in the case of digital controls. Even if, however, the control system to be handled is a linear time invariant system, its design theory is so difficult to understand that it cannot be established to cope with many practical systems including the general non-linear elements. Still the worse, a room to be further improved is left in the digital control at the present stage.

Here, I, Nobuo Yamamoto has disclosed a related technology in U.S. Pat. No. 4,904,912 ("Control Mechanism Employing Internal Model Coordination Feedforward Method") and in U.S. patent application Ser. No. 182,432, now U.S. Pat. No. 4,953,076, entitled "Versatile Time Difference Comparison Compensation Method of Control System." However, the effect of the stabilizability of perturbations cannot be expected from both the versatile time difference comparison compensation method for the control system and the internal model coordination feedforward method of the control system. However, the effect of the stabilizability of perturbations cannot be expected from both the versatile time difference comparison compensation method for the control system and the internal model coordination feedforward method of the control system.

So, it cannot be said that the above-specified technologies of the prior art have succeeded in making adjustments for the supreme states while satisfying the quickness of responses, stabilizability of perturbations and other several characteristics simultaneously. It is the current practice to sacrifice and compromise some of those characteristics to some extent.

SUMMARY OF THE INVENTION

An object of the present invention is to provide a two-degrees-of-freedom time difference comparison compensation method and apparatus for a control system, which can make adjustments for the supreme state while satisfying the quickness of responses and the stabilizability of perturbations simultaneously.

Another object of the present invention is to provide a two-degrees-of-freedom time difference comparison compensation method and apparatus for a control system, which can make adjustments for the supreme state while satisfying the quickness of responses and other several characteristics simultaneously.

Still another object of the present invention is to make a structure as a hardware, a software, a versatile control system to be realized as a composite of the two functions, an especial control apparatus or a built-in control apparatus for an individual control system.

In order to achieve the above-specified objects, according to the two-degrees-of-freedom time difference comparison compensation method and apparatus of the present invention, a desired value or reference value and its corresponding feedback variable are inputted into a versatile time difference compensator, and then the derived output signal is transmitted into successive conventional controller or regulator. In short, the conventional controller or regulator and the versatile time difference compensator are combined and independently controlled to achieve the two-degrees-of-freedom controls.

Here will be described the structural principle of the present invention with reference to the principle explaining diagram of FIG. 1. In FIG. 1: reference numeral 1 designates a desired value or reference value; numeral 2 a versatile time difference compensator; numeral 3 the output of the versatile time difference compensator; numeral 4 a regulator (which contains the role of a controller) used generally in the prior art (as will be shortly referred to as the "conventional regulator"); numeral 5 a manipulation variable; numeral 6 disturbances; numeral 7 a controlled system; numeral 8 a controlled variable; numeral 9 a feedback element; numeral 10 a feedback variable; and numeral 11 a state feedback.

Specifically, by inputting the output of the versatile time difference compensator 2 to the conventional regulator 4, according to the structure of the present invention, the conventional regulator 4 and the versatile time difference compensator 2 are given the burden of a function to make independent or quasiindependent adjustments for the synthetic characteristics including the stabilizability of perturbations, or the stabilizability of perturbations and the quickness of responses and other several characteristics, and for the synthetic characteristics including the improvement in the quickness of responses, or the quickness of responses and the stabilizability of perturbations and other several characteristics. Thus, the present invention can provide the two-degrees-of-freedom control which is far superior to that of the prior art.

The conventional regulator 4 is exemplified by every controller or regulator such as the PID controller, the I-PD control compensator or the optimal regulator.

The versatile time difference compensator 2, which has been described in detail by my U.S. patent, can be reconstructed of only two branches of the desired value or reference value 1 by an equivalent conversion, as shown in FIG. 2. In FIG. 2, portions shared with FIG. 1 are designated at the common reference numerals. Reference numeral 12 designates branches; numeral 13 a direct comparison; numeral 14 a first difference value; numeral 15 a lag element; numeral 16 a time difference comparison; numeral 17 a second difference value; numeral 18 and 19 weighting elements; numeral 20 a sum; and numeral 21 a gain readjustment element.

The two-branched versatile time difference compensator 2 shown in FIG. 2 can be shown, as in FIG. 3 by the equivalent conversion of the block diagram. In FIG. 3, portions shared with FIG. 1 are designated at the common reference numerals. Numeral 22 designates a time difference comparison filter, and numeral 23 designates a time difference equivalent comparison.

Since the conventional regulator 4 usually has a gain adjustment function, the gain parameter Kr of the gain readjustment element 21 is set, as follows, so far as it is not especially necessary:

$$Kr = 1 \quad (1).$$

The operations of the present invention will be described in the following.

In the two-degrees-of freedom control method having introduced thereinto the versatile time difference comparison compensation for the control system of the present invention, in the state, in which the control system is returned to the feedback control system of the prior art using not the versatile time difference compensator 2 but the conventional regulator 4, or in the state, in which the gain coefficient of the gain readjustment element 21 of the versatile time difference compensator 2 is set, as expressed in the Equation (1), and in which the weight of the weighting element 18 of the versatile time difference compensator 2 is set at a=1 to establish a state equivalent to that using none of the versatile time difference compensator 2, the conventional regulator 4 is so adjusted that the perturbations may be reduced to the least by the conventional method or so that the proper characteristics intended by the designer may be obtained in the synthetic characteristics including the stabilizability of perturbations, the quickness of responses and other several characteristics. Next, the versatile time difference compensator 2 is so set as takes the state shown in FIG. 1. Adjustments are made such that the several adjustment parameters of the versatile time difference compensator 2 including the weight a of the weighting element 18 shown in FIG. 2 may take the highest quickness of responses or such that the synthetic characteristics including the quickness of responses, the stabilizability of perturbations and/or other several characteristics may be finally improved. Especially in case the gain coefficient of the gain readjustment element 21 of the versatile time difference compensator 2 is so set as is expressed in the Equation (1), the versatile time difference compensator 2 is absolutely independent of the conventional regulator 4 from the standpoint of functions so that it burdens the quickness of responses and retains the stabilizability of perturbations and other several characteristics adjusted by the conventional regulator 4 but without any change in those characteristics.

By adjusting the versatile time difference compensator 2 and the conventional regulator in combination, or independently or substantially independently of each other, as has been described hereinbefore, the individual merits of the two can be exhibited to execute the better two-degrees-of-freedom controls than the prior art.

Here will be described the method of setting the several adjustment parameters of the conventional regulator 4 and the versatile time difference compensator 2 according to the present invention.

The several adjustment parameters of the conventional regulator 4 are adjusted according to the prior art method but on trial as the time may be.

The method for the versatile time difference compensator 2 to determine the several adjustment parameters for realizing the excellence of the response to the desired value as its important role will be described in connection with its four first to fourth kinds.

According to the first determination method, the several adjustment parameters of the versatile time difference compensator 2 are determined in the following procedures (1-1) to (1-5) in case both the transmission function C(s) of the lag element 15 (as shown in FIGS. 2 and 3) of the versatile time difference compensator 2 and the closed loop transfer function N(s) in the closed loop, which contains the conventional regulator 4 and is prepared by feeding back the feedback variable 10 to the time difference equivalent comparison 23 (as shown in FIG. 3), are expressed by a linear and strictly proper fractional polynomial:

(1-1): A standard model W(s) to be desired as an ideal model between the desired value or reference value 1 and the controlled variable 8 is imagined. In the case of the critical damped type of no overshoot in a step response, the standard model W(s) is expressed as follows:

$$W(s) = 1/(1+s\alpha)^l \quad (2),$$

wherein:

l = 1, 2, 3, - - - ; and

α = the time constant of the standard model.

(1-2): the transfer function T(s) of the whole control system including the versatile time difference compensator 2 and the conventional regulator 4 for handling the relation between the desired value or reference value 1 and the controlled variable 8 is expressed by the product of the aforementioned closed loop transfer function N(s) and the transfer function {a+(1−a)C(s)} of the time difference comparison filter 22 shown in FIG. 3:

$$T(s) = \{a+(1-a)C(s)\}N(s) \quad (3).$$

This transfer function T(s) is rewritten into a fractional polynomial to determine the difference between the degrees of the denominator and numerator so that the degree l of the standard model W(s) given by the Equation (2) is set at the aforementioned difference of the degrees.

(1-3): The aforementioned difference T(s)−W(s) of the T(s) and W(s) is taken, and the same number of terms as that of the all adjustment parameters of the versatile time difference compensator 2 is extracted from the terms of lower degrees of the difference T(s)−W(s). Then, the conditional equations are set up by setting the coefficients of these individual terms at zeros.

(1-4): In the example of the aforementioned standard model given by the Equation (2), the proper value of the time constant $\alpha$ is finally determined by the transfer function T(s) of the Equation (3) containing the several adjustment parameters. From the foregoing procedure (1-3), the relation among the all adjustment parameter is determined by making the individual conditional equations simultaneous.

(1-5): the combination of the values to be taken by the aforementioned adjustment parameters in the foregoing procedure (1-4) exists continuously within a certain range and takes an approximate proper value. One combination of the adjustment parameters for optimizing the setting of the quickness of responses is finally determined on the basis of trail experiments or simulations using a computer. In the case of the real system, a method of parameters identification or the like applied.

The procedures thus far described are applied under the continuous control but may be an approximate criterion in the digital control.

The second method of determining the all adjustment parameters of the versatile time difference compensator 2 is effective in the digital control and is determined through the following procedures:

(2-1): The standard model desired as an ideal model between the desired value or reference value 1 and the controlled variable 8 imagines a pulse transfer function W(z) which is prepared by subjecting the standard model W(s) specified in the foregoing setting procedure (1-1) to a z-transformation.

(2-2): The degree l of the aforementioned standard model is determined in accordance with the foregoing procedure (1-2).

(2-3): The Equation (3) is subjected to the z-transformation to determine the pulse transmission function T(z).

(2-4) The variable z is changed to $\epsilon$ by the following Equation (4) to re-express the T(z) to T($\epsilon$) and the W(z) to W($\epsilon$):

$$\epsilon = z - 1 \quad (4).$$

If the sample time is designated at T, $z \to 1$ for $s \to 0$ (the lower degree is noted for approximations) because $z = e^{sT}$ from the definition of the z-transformation. Then, there is introduced the variable $\epsilon$ for $z - 1 \equiv \epsilon \to 0$. Thus, the analyses are drastically facilitated.

(2-5): The individual conditional equations are set up from the terms of the lower degrees of $\epsilon$ of T($\epsilon$)−W($\epsilon$) by setting the coefficients of the terms of the same number of the adjustment parameters of the versatile time difference compensator 2 at zeros.

(2-6): The time constant $\alpha$ of the standard model Equation (2) has been described in the procedure (1-4). Thus, the relational equations among the all adjustment parameters are determined by making the individual conditional equations of the foregoing procedure (2-5) simultaneous and solving them by eliminating the time constant $\alpha$.

(2-7): The combination of the values to be taken by the adjustment parameters obtained from the aforementioned procedure (2-6) exists continuously within a certain range and takes approximate, proper values. Of these, one set of combination of the adjustment parameters for the most quickness of responses is finally determined on the basis of trail experiments or simulations using a computer. In the case of a real system, the parameters identification or the like is applied.

Thus, the second method of determining the adjustment parameters of the versatile time difference compensator 2 effective for the digital control has been described hereinbefore.

In case the control system to be handled may contain dead times, dead times may be set as new adjustment parameters even in the transfer function C(s) of the reference lag element 15 of the versatile time difference compensator 2 to formulate polynomials by the series expansions of the expressions for the dead times so that the first or second method of determining the adjustment parameters of the versatile time difference compensator 2 can be utilized.

In case the control system to be handled is nonlinear, the first or second method of determining the adjustment parameters of the versatile time difference compensator 2 can be utilized in a linear approximation.

In case the first or second method of determining the adjustment parameters of the versatile time difference compensator 2 cannot be utilized, third or fourth determination methods are still available, as will be described in the following.

According to the third method of determining the adjustment parameters of the versatile time difference compensator 2, a relation of $s = j\omega$ is substituted into the handled transfer function T(s) existing between the desired value or reference value 1 and the controlled variable 8 and belonging to the whole control system including the versatile time difference compensator 2 and the conventional regulator 4, to plot the gain frequency characteristics in the Bode diagram in the form of a graph. The gain to frequency characteristics must exhibit a flatness of 0 [dB] from the low to medium regions of the angular frequency $\omega$. Thus, the determination is carried out by suppressing the excess over 0 [dB] to the minimum for the whole region of $\omega$ in the low, medium and high regions.

According to the fourth method, the adjustment parameters of the versatile time difference compensator 2 are determined by applying the model signal (e.g., step signal) of the desired value or reference value 1, by making the optimal state of the response of the controlled variable 8 (e.g., by suppressing the overshoot to the minimum and by making all or any of the delay time, the rise-up time or the settling time to the minimum). This method has an equivalent physical meaning to that of the third method of determining the adjustment parameters of the versatile time difference compensator 2.

BRIEF DESCRIPTION OF THE DRAWINGS

The present invention will become more obvious from the following detailed description when taken in conjunction with the accompanying drawings, wherein:

FIG. 8 is a diagram showing the step responses according to the linear quadratic optimal control using the internal mode of the prior art.

DESCRIPTION OF THE PREFERRED EMBODIMENTS

Figure 1:
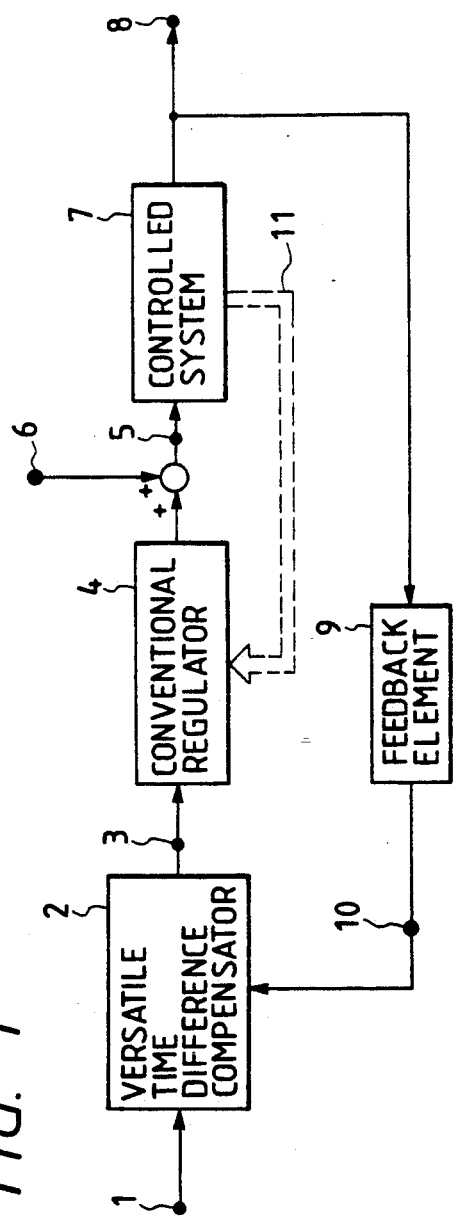
FIG. 1 is a diagram for explaining the principle of the method of two-degrees-of-freedom time difference comparison compensation for a control system in accordance with the present invention.
Figure 3:
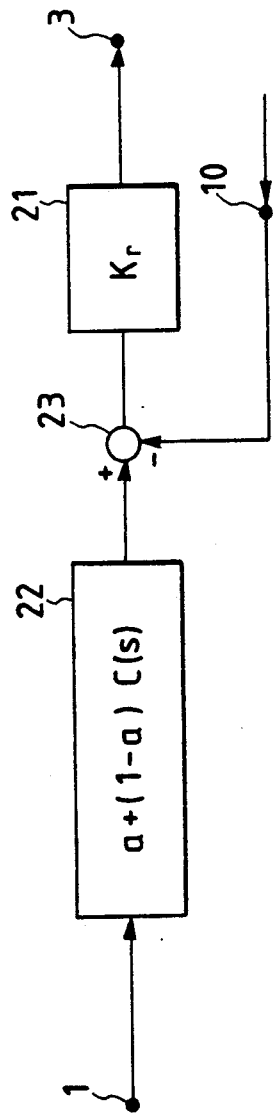
FIG. 3 is an equivalent block diagram representation in FIG. 2.
Figure 4:
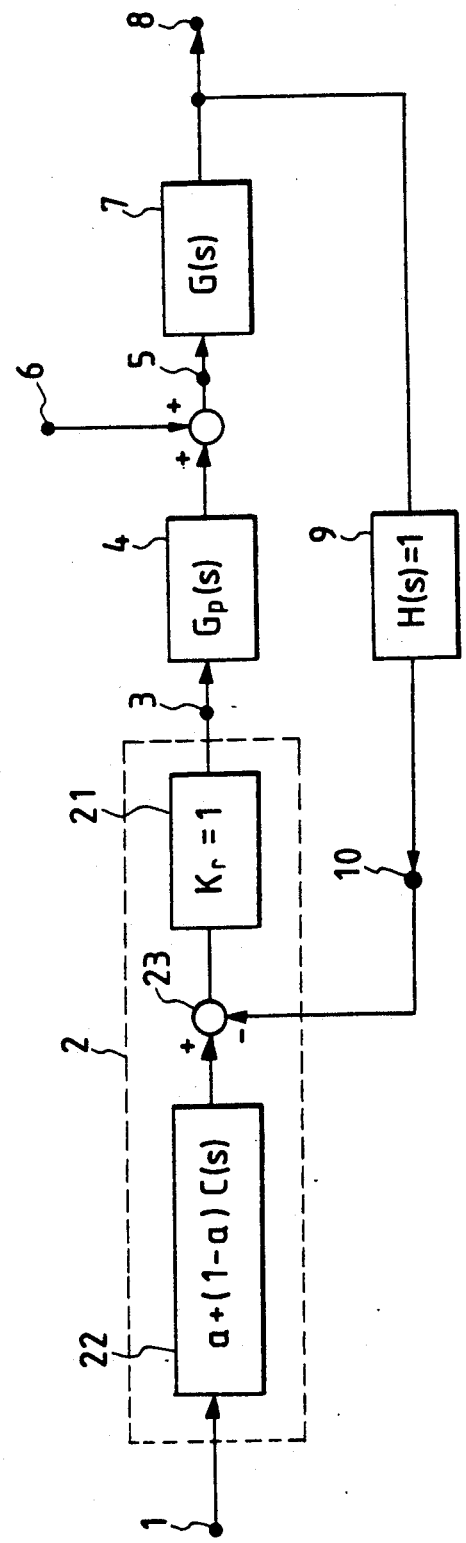
FIG. 4 is a block diagram representation showing a control system for practicing one embodiment of the two-degrees-of-freedom time difference comparison compensation method for the control system in accordance with the present invention.

In FIG. 4 presenting a block diagram of the control system for practicing one embodiment, the portions shared with FIGS. 1 and 3 are designated at the common reference numerals. As the typical use of the two-degrees-of-freedom control method introducing the versatile time difference comparison compensation method of the present invention, the embodiment is exemplified by adjusting the conventional regulator 4 for the stabilizability of perturbations and the versatile time difference compensator 2 for the quickness of responses independently of each other, and the resultant characteristics are compared with those of the two-degree-of-freedom of the prior art and also compared with those of a linear quadratic optimal control of prior art.

In order to clarify the fundamental characteristics, the transfer function of the direct feedback system, i.e., the feedback element 9 is set at $H(s)=1$. In order to present the typical example of use, as described above, or to subject the versatile time difference compensator 2 and the conventional regulator 4 to the two-degrees-of-freedom control completely independent of each other, the gain coefficient of the gain readjustment element 21 is expressed by the Equation (1), i.e., $Kr=1$.

The transfer function of the controlled system 7 to be used is expressed by:

$$G(s) = 1/s(s+1) \tag{5}$$

the conventional regulator 4 used is the PID controller, and its transfer function is expressed by:

$$Gp(s) = Kp(1 + 1/sTd + sTd) \tag{6}$$

The digital control is accomplished for the sample time $T=1$.

By the conventional method and the trial adjustment for the digital control, the individual optimum values of the several adjustment parameters of the PID controller for the most stabilizability of perturbations are obtained, as follows:

$$Kp=1.0; \; Ti=4.1; \text{ and } Td=0.6 \tag{7}$$

Figure 5:
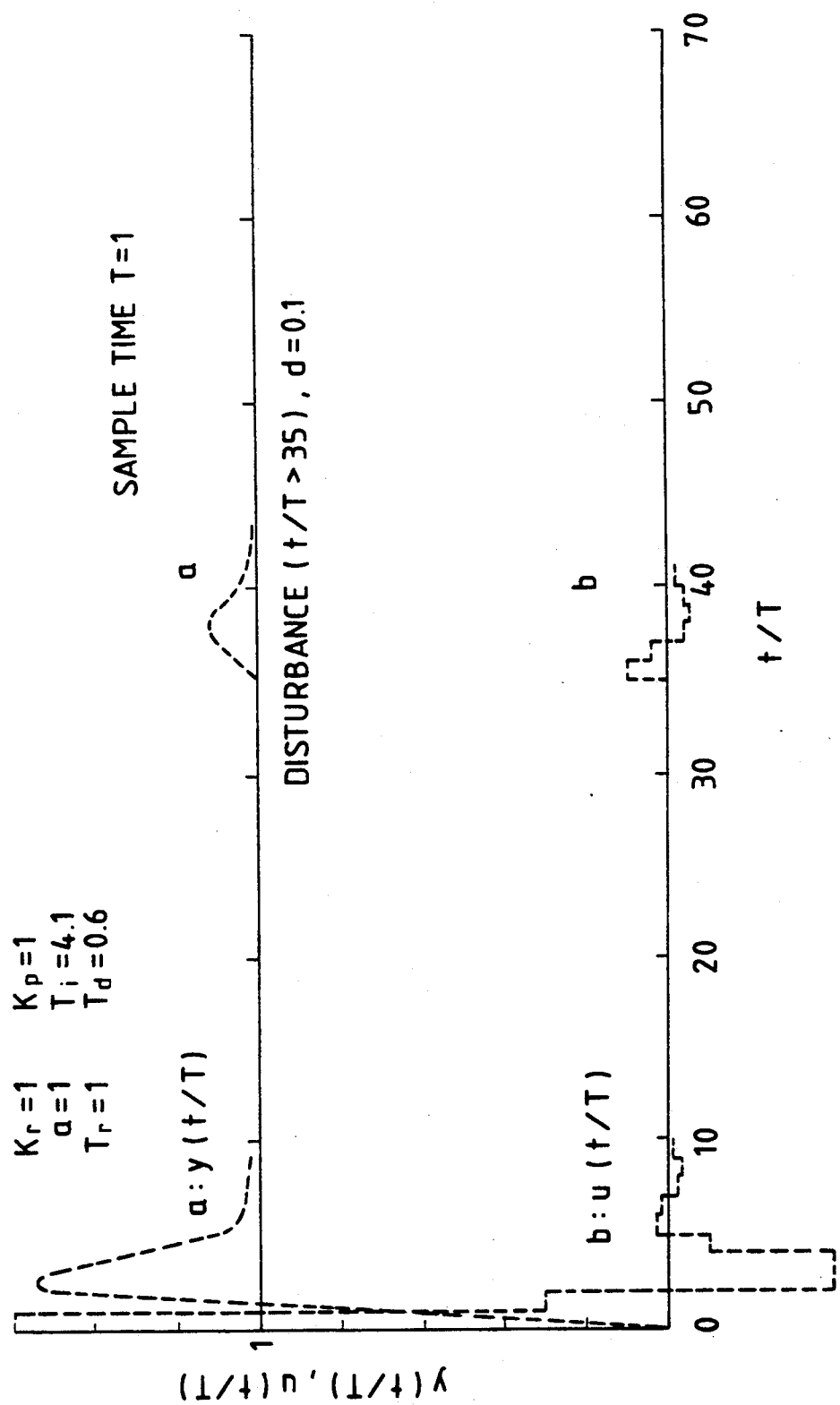
FIG. 5 is a diagram showing the step responses by the conventional PID control in case the perturbations are minimized.

FIG. 5 presents a diagram showing the step responses by the conventional PID control in case the stabilizability of perturbations is minimized. In FIG. 5, the abscissa and ordinate plots t/T, y(t/T) and u(t/T), respectively. A curve a appearing in FIG. 5 plots the unit step response of controlled variable 8 when the versatile time difference compensator 2 is not used. However, the stepped disturbances having a magnitude of 0.1 for the time band of a time $t \geq 35$ are applied to the disturbance 6. Another curve of FIG. 5 plots the response of the manipulation variable 5. From FIG. 5, it is found that a large overshoot is caused as a reaction to the suppression of the minimum perturbations in the responses to the desired value.

Next, an approach of the response to the desired value to that obtained by the standard model (2) is tried by using the standard model Equation (2).

Figure 2:
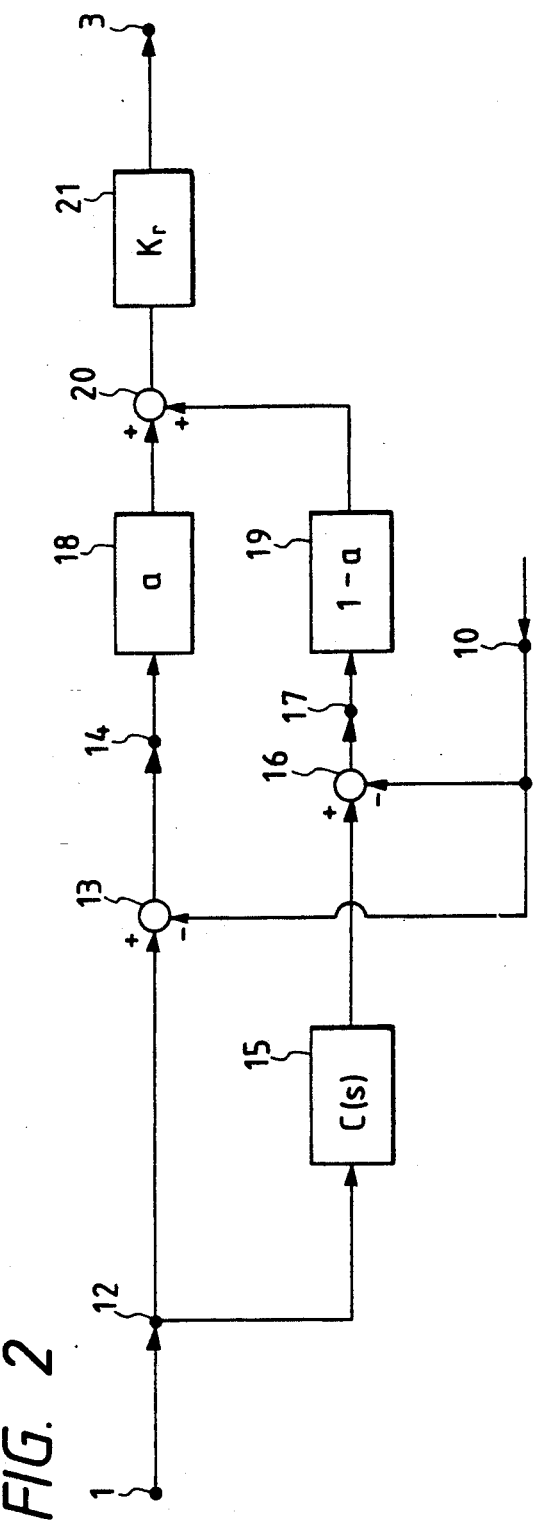
FIG. 2 is a diagram for explaining the principle of one example of the versatile time difference compensator of FIG. 1.

The transfer function C(s) of the lag element 15 (as shown in FIG. 2) in the versatile time difference compensator 2 is set at the following most simple form easy to handle:

$$C(s) = 1/(1+sTr) \tag{8}$$

In this case, the number of the adjustment parameters of the versatile time difference compensator 2 is two, i.e., the weight constant a of the weighting element 18 and the time constant Tr of the lag element 15. The optimum values of these a and Tr are determined in the following manner.

First of all, in accordance of the aforementioned first method the adjustment parameters of the versatile time difference compensator 2, the T(s) of the Equation (3) is expressed in the following form by the Equations (5), (7) and (8):

$$T(s) = \frac{(1 + aTrs)(2.46s^2 + 4.1s + 1)}{(1 + Trs)(4.1s^3 + 6.56s^2 + 4.1s + 1)} \tag{9}$$

From this, in accordance with the aforementioned design procedure (1-2), the value of the degree 1 of the standard model Equation (2) is determined by:

$$1 = 1 \tag{10}$$

In accordance with the aforementioned design procedure (1-3), the following two conditional Equations are obtained:

$$a - (1-a)Tr = 1 \tag{11}$$

and $$4.1 \{a - (1-a)Tr\} + aaTr = 4.1 \tag{12}$$

According to the design procedure (1-4), the following relation between a and Tr is obtained by eliminating the value $\alpha$ from the Equations (11) and (12):

$$Tr = 2.025/\sqrt{a(1-a)} \tag{13}$$

According to the second method of the adjustment parameters of the versatile time difference compensator 2, the pulse transmission function by the e expression of the standard model is expressed from the Equations (2) and (10) by the aforementioned design procedures (2-1) to (2-4), as follows:

$$W(\epsilon) = (1 - e^{-T/a})/(\epsilon + 1 - e^{-T/a}) \tag{14}$$

On the other hand, the pulse E-expressed transfer function for the transfer function T(s) of the whole control system including the versatile time difference compensator 2 is expressed from the Equation (9), as follows:

$$T(\epsilon) = \frac{a_\epsilon + 1 - e^{-T/Tr}}{\epsilon + 1 - e^{-T/Tr}} \tag{15}$$

-continued $$\frac{0.3679\epsilon^3 + 1.3105\epsilon^2 + 1.2553\epsilon + 0.1542}{\epsilon^4 + 2.0\epsilon^3 + 1.9426\epsilon^2 + 1.2553\epsilon + 0.1542}.$$

The following two conditional equations are obtained from the preceding design procedure (2-5):

$$\eta - (1-a)\zeta = 0 \tag{16};$$

and $$0.1542a + 1.2553\{\eta - (1-a)\zeta\} - 0.6321\eta\zeta = 0 \tag{17},$$

wherein the following definitions are made:

$$\eta \equiv 1 - e^{-1/Tr} \tag{18};$$

and $$\zeta \equiv 1 - e^{-1/a} \tag{19}.$$

In accordance with the preceding design procedure (2-6), the Equations (16) and (17) are rearranged by eliminating the value $\zeta$ containing the value $a$ to give the following relation between a and Tr:

$$Tr = -1/\ln\{1 - 0.4939 \sqrt{a(1-a)}\}. \tag{20}$$

Finally, in accordance with the preceding design procedure (2-7), the following values are obtained by the trials of the computer simulations of the combination of a and Tr for the optimum response to the desired value, while using the relation of the Equation (20):

$$a = 0.35 \tag{21};$$

and $$Tr = 3.41 \tag{22}.$$

According to the relational Equation (20) to be applied to the digital control, the following calculated value is obtained for the value a given from the Equation (21):

$$Tr = 3.74 \tag{23}.$$

It is found that the approximation obtained is within an error of 10% or less from the value of the Equation (22) obtained by the final trial so that the second determination method of the adjustment parameters of the versatile time difference compensator 2 in the aforementioned discrete control, the digitized control or the digital control is effective.

If, on the other hand, the value a given by the Equation (21) is substituted into the relational Equation (13) in the case of the continuous control, the following value of obtained:

$$Tr = 4.22 \tag{24}.$$

It is found that the approximation obtained is within an error of 20% from the Tr value obtained from the Equation (22) by the final trial so that the first determination method of the adjustment parameters of the versatile time difference compensator 2 in the continuous discrete control, the digitized control or the digital control.

Figure 6:
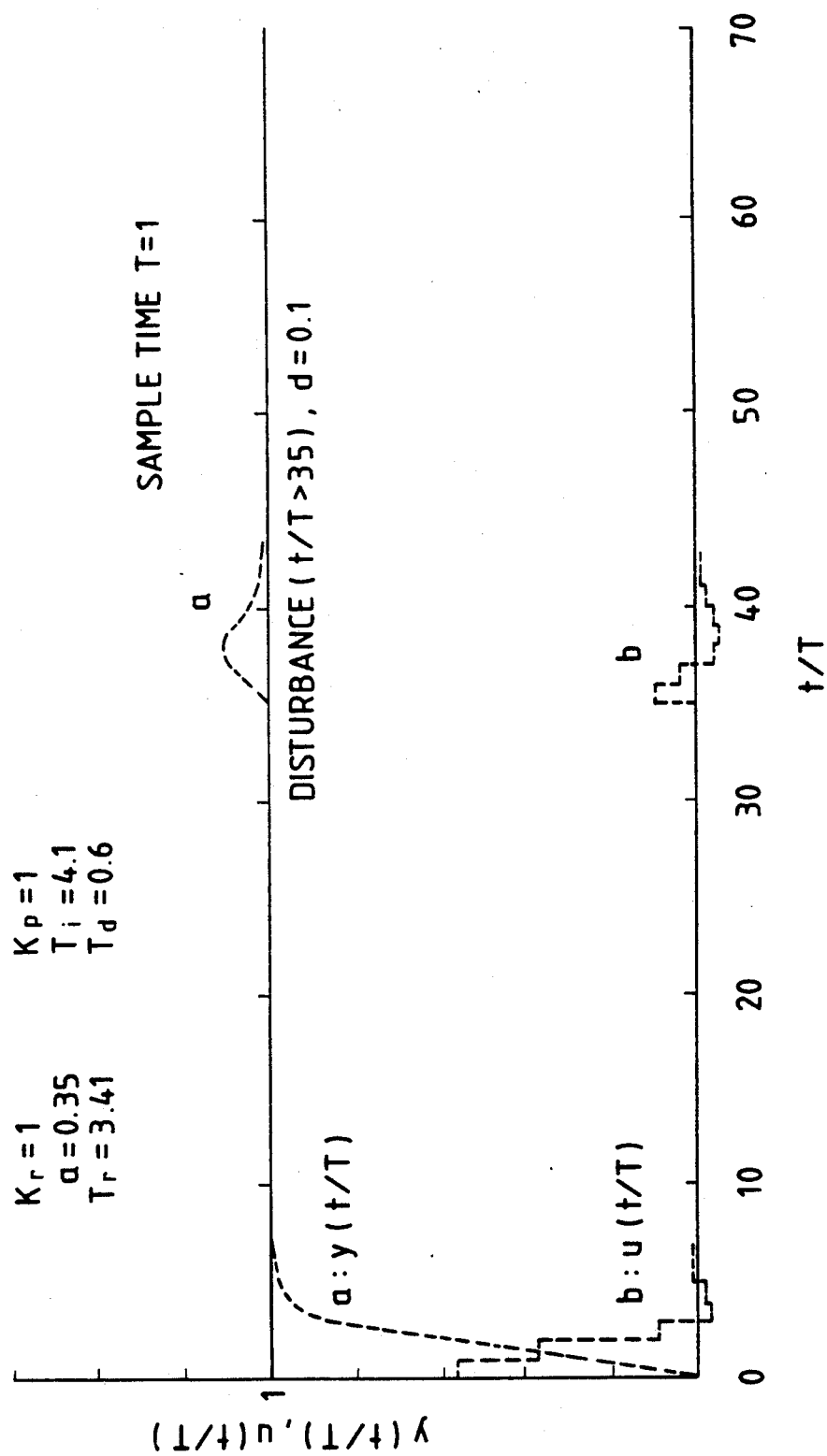
FIG. 6 is a diagram showing the step responses according to the embodiment of the present invention.

The unit step responses of the control system, which uses, as shown in the block diagram of FIG. 4, the versatile time difference compensator 2 having the several adjustment parameters determined from the Equations (21) and (22), are plotted in FIG. 6. In FIG. 6, the ordinate and abscissa plot the values t/T, y(t/T) and u(t/T), respectively.

A curve a appearing in FIG. 6 plots the unit step response of the controlled variable 8. The disturbance 6 is under the same condition as that of the response of FIG. 5. On the other hand, a curve b appearing in FIG. 6 plots the response of the manipulation variable 5.

The response to the desired value, as indicated by the curve a of FIG. 6, closely resembles the unit step response to the standard model, as given in the Equation (2) with l=1, so that one of the initial objects for the quickness of responses can be achieved. It is further found that the response to the desired value, as indicated by the curve a of FIG. 6 is far more improved over that indicated by the curve a of FIG. 5. Moreover, the characteristics of the stabilizability of perturbations, as indicated by the time band of t≧35 of the curve a of FIG. 6 retain those which are reduced to the minimum, as appearing in the time band like the case of FIG. 5. Thus, the effect of the two-degrees-of-freedom control is confirmed. Still more-over, the manipulation variable of the curve b of FIG. 6 can be far smaller than that of the curve b of FIG. 5.

Thus, it has been verified that the two-degrees-of-freedom having introduced thereinto the versatile time difference comparison compensation method of a control system of the present invention has made a drastic improvement in the quickness of responses over that of the PID control of the prior art.

Figure 7:
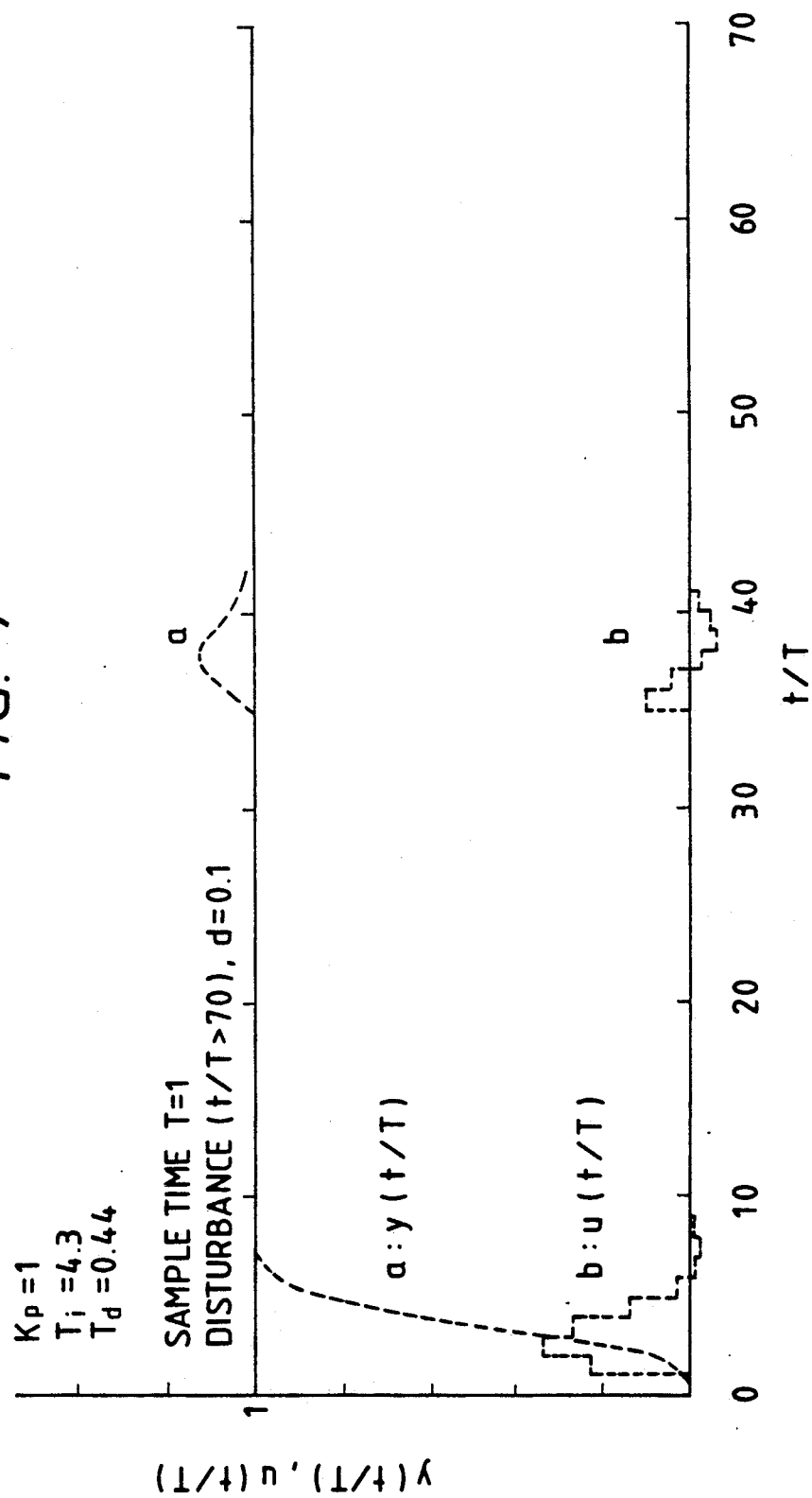
FIG. 7 is a diagram showing the step responses according to the I-PD control method according to the two-degrees-of-freedom control of the prior art.

Next, the unit step responses are plotted in FIG. 7 when the I-PD control which is the most useful one of the two-degrees-of-freedom control methods of the prior art is accomplished by using the same controlled system 7 (the transfer function of which is given by the Equation (5)) as the aforementioned one to adjust both of the quickness of responses and the stabilizability of perturbations to the best. In FIG. 7, the abscissa and ordinate plot t/T, y(t/T) and u(t/T), respectively. A curve a appearing in FIG. 7 plots the unit step response of the controlled variable 8. And, a curve b plots the change of the manipulation variable 5. Here, the disturbance 6 given is the same as the aforementioned one.

Next, the unit step responses are plotted in FIG. 8 when the LQ (i.e., Linear Quadratic) optimal digital control of the prior art using the internal model principle is accomplished by using the same controlled system 7 (the transfer function of which is given by the Equation (5)) as the aforementioned one to minimize the following performance index by determining an optimal regulator ($f_0$, $f_1$, $f_2$):

$$J = \sum_{i=0}^{\infty} [p\{r - y(i)\}^2 + q\{u(i)\}^2]. \tag{25}$$

Here, letter i designates the sample number, and letters p and q designate the weight for performances and take p=q=1, as shown in FIG. 8. In FIG. 8, the abscissa and ordinate plot t/T, y(t/T) and u(t/T), respectively. A curve a appearing in FIG. 8 plots the change of the controlled variable 8, and a curve b plots the change of the manipulation variable 5. However, the disturbance 6 applied is similar to the aforementioned one. A prominent improvement in the response to the desired value is not found even if the values p and q are changed.

By comparing the two curves a of FIGS. 6 and 7, it is found that the stabilizability of perturbations is similar for the two curves and that the quickness of responses of FIG. 6 is far better.

By comparing the two curves a of FIGS. 6 and 8, it is found that the characteristics of perturbation stabilizability of FIG. 8 is far better but that the quickness of response of FIG. 6 is far better.

Thus, the two-degrees-of-freedom having introduced thereinto the versatile time difference comparison compensation method for a control of the present invention exhibits nearly as high characteristics in the stabilizability of perturbations as those of the method of the prior art but a far higher effect in the improvement in the quickness of responses.

Even in case, moreover, the conventional regulator 4 is exemplified by the two-degrees-of-freedom control apparatus of the prior art or the digital optimal regulator, it is possible to realize a more effective newly constructed two-degrees-of-freedom control method which is enabled to improve the quickness of responses, the stabilizability of perturbations and other several characteristics by constructing in combination with the versatile time difference compensator 2, as shown in FIG. 1. In this case, the aforementioned methods of determining the parameters of the versatile time difference compensator 2 are also effective.

In the embodiment thus far described, the description has been directed only to the case in which the conventional regulator is exemplified by one having the feedback actions. Despite of this fact, however, the present invention can be applied with similar effects to the case in which the regulator has feedforward action.

Moreover, the two-degrees-of-freedom of the present invention can be constructed as the hardware, the software, the versatile control apparatus having the two united functions, the especial control apparatus, or the built-in control apparatus of an individual control system.

Thus, the present invention has a remarkably high effect for the industry because it can provide the method and apparatus of two-degrees-of-freedom time difference comparison compensator, which can be adjusted to the highest or optimal state while satisfying the quickness of responses, the stabilizability of perturbations and other several characteristics simultaneously.

I claim:

1. In a control system using a controller or a regulator for executing the stabilization of perturbations and the regulation of responses to a desired value or a reference value, an apparatus of two-degrees-of-freedom time difference comparison compensator, comprising:

a versatile time difference compensator disposed upstream of said controller or said regulator and including (a) means for branching said desired value or said reference value into a primary branch and an n-number of branches (wherein n designates a positive integer except for one);

(b) means for comparing said primary branch directly with a feedback variable to obtained a primary difference value;

(c) means for transmitting said n-number of branches of said reference value into lag elements having various delay times;

(d) means for comparing the outputs of the respective said lag elements with said feedback variable respectively to obtain an n-number of difference values;

(e) means for transmitting said primary difference value and said n-number of difference values into various weighting elements to multiply said primary difference value and said n-number of difference values by various weights thereby to obtain weighted signals;

(f) means for calculating the sum of said weighted signals to obtain a sum signal; and (g) means for transmitting said sum signal into a gain adjustment element to re-adjust a gain for said sum signal to be outputted to said controller or said regulator thereby to produce an operation value; and means for producing said feedback variable from a controlled variable controlled by said controller or said regulator and feeding back said feedback variable to said versatile time difference compensator.

2. An apparatus of two-degrees-of-freedom time difference comparison compensator according to claim 1, wherein said controller or said regulator includes a PID controller, an I-PD controller and an optimum regulator.

3. In a control method for executing the stabilization of perturbances and the regulation of responses to a desired value or a reference value by a controller or a regulator, a method of two-degrees-of-freedom time difference comparison compensator, comprising the steps of:

branching said desired value or said reference value into a primary branch and an n-number of branches (wherein n designates a positive integer except for one);

comparing said primary branch directly with a feedback variable to obtained a primary difference value;

transmitting said n-number of branches of said reference value into lag elements having various delay times;

comparing the outputs of the respective said lag elements with said feedback variable respectively to obtain an n-number of difference values;

transmitting said primary difference value and said n-number of difference values into various weighting elements to multiply said primary difference value and said n-number of difference values by various weights thereby to obtain weighted signals;

calculating the sum of said weighted signals to obtain a sum signal;

transmitting said sum signal into a gain adjustment element to re-adjust a gain for said sum signal to be outputted to said controller or said regulator to produce an operation value; and inputting the output thus obtained by the versatile time difference compensation method to said controller to said regulator.

4. A method of two-degrees-of-freedom time difference comparison compensator according to claim 3, wherein said controller or said regulator included a PID controller, an I-PD controller and an optimum regulator.

5. A method of two-degrees-of-freedom time difference comparison compensator according to claim 3, further comprising the steps of:

expressing or approximately expressing a transfer function T(s) between the desired or reference value of a total control system including a versatile time difference compensator and a controlled variable in the form of a fractional polynomial of s;

setting a standard model W(s) having the same order as that of the difference between the denominator and numerator of said fractional polynomial;

extracting the difference T(s)–W(s) between said T(s) and said W(s) into the same number of terms as that of the adjustment parameters of said versatile time difference compensator from lower to higher order terms of s;

determining approximate relations among the adjustment parameters of said versatile time difference compensator, which are obtained by formulating individual conditional equations with the individual coefficients of said terms being set at zero and by eliminating the undetermined parameters of said W(s) with said conditional equations being simultaneous; and applying the determined approximate relations to the adjustment of said adjustment parameters.

6. A method of two-degrees-of-freedom time difference comparison compensator according to claim 3, further comprising the steps of:

setting a standard model W(s) having the same order as that of the difference between the denominator and numerator of the fractional polynomial of s, which is expressed or approximately expressed from a transfer function T(s) between the desired or reference value of a total control system including a versatile time different compensator and a controlled variable;

determining individual pulse transmission functions T(z) and W(z) by subjecting said T(s) and W(s) to a z-transformation;

indicating the pulse transfer functions of $\epsilon$ at T($\epsilon$) and W($\epsilon$), respectively, by a transformation of $\epsilon = z - 1$;

extracting the same number of terms as that of the adjustment parameters of said versatile time difference compensator from lower to higher order terms of the difference T($\epsilon$)–W($\epsilon$);

determining approximate relations among the adjustment parameters of said versatile time difference compensator, which are obtained by formulating individual conditional equations with the individual coefficients of said terms being set at zero and by eliminating the undetermined parameters of said W(s) with said conditional equations being simultaneous; and applying the determined approximate relations to the adjustment of said adjustment parameters.

7. A method of two-degrees-of-freedom time difference comparison compensator according to claim 3, further comprising the steps of:

setting a standard model W(s) having the same order as that of the difference between the denominator and numerator of the fractional polynomial of s, which is expressed or approximately expressed from a transfer function T(s) between the desired or reference value of a total control system including a versatile time different compensator and a controlled variable; and adjusting the parameters of said versatile time difference compensator such that the gain to frequency characteristics of the Bode diagram of said T(s) is flat of 0 [dB] from low to medium regions of an angular frequency $\omega$ and such that the excess of said gain over 0 [dB] is minimized for all said $\omega$ from medium to high regions.

8. A method of two-degrees-of-freedom time difference comparison compensator according to claim 3, further comprising the steps of:

setting a standard model W(s) having the same order as that of the difference between the denominator and numerator of the fractional polynomial of s, which is expressed or approximately expressed from a transfer function T(s) between the desired or reference value of a total control system including a versatile time different compensator and a controlled variable; and adjusting the parameters of said versatile time difference compensator such that by applying a model signal of the desired value or reference value an optimal state of the response of controlled variable is made so as to suppress overshoot and so as to make all or any of the delay time, the rise-up time and the settling time to the minimum.

* * * * *